United States Patent
Meier et al.

(10) Patent No.: US 11,565,838 B2
(45) Date of Patent: Jan. 31, 2023

(54) MOULD FILLING WITH SUBSEQUENT CLOSING UNDER INTERNAL PRESSURE

(71) Applicant: KRONES AG, Neutraubling (DE)

(72) Inventors: Dominik Meier, Parsberg (DE); Andreas Pense, Regensburg (DE); Cora Hanesch, Regensburg (DE); Andreas Vornehm, Offenberg (DE); Christian Betz, Geigant (DE)

(73) Assignee: KRONES AG

( * ) Notice: Subject to any disclaimer, the term of this patent is extended or adjusted under 35 U.S.C. 154(b) by 183 days.

(21) Appl. No.: 16/595,238

(22) Filed: Oct. 7, 2019

(65) Prior Publication Data
US 2020/0122865 A1 Apr. 23, 2020

(30) Foreign Application Priority Data
Oct. 17, 2018 (DE) ...................... 10 2018 125 794.5

(51) Int. Cl.
*B29C 49/28* (2006.01)
*B29C 49/42* (2006.01)
(Continued)

(52) U.S. Cl.
CPC .............. *B65B 3/022* (2013.01); *B29C 49/12* (2013.01); *B29C 49/28* (2013.01);
(Continued)

(58) Field of Classification Search
CPC .... B29C 49/28; B29C 49/4273; B65B 31/003
(Continued)

(56) References Cited

U.S. PATENT DOCUMENTS 3,516,224 A * 6/1970 Augusto ............... B65B 31/003
                                                              53/510
3,969,455 A    7/1976 Moller ........................... 264/89
(Continued)

FOREIGN PATENT DOCUMENTS

DE      102014104874      10/2015      ............. B29C 49/46
EP      0 409 388         1/1991       ............... B65D 1/02
(Continued)

OTHER PUBLICATIONS

German Search Report (w/machine translation) issued in application No. 10 2018 125 794.5, dated Jul. 23, 2019 (14 pgs.)
(Continued)

*Primary Examiner* — Thanh K Truong
*Assistant Examiner* — Patrick B Fry
(74) *Attorney, Agent, or Firm* — Hayes Soloway P.C.

(57) ABSTRACT

Disclosed is an apparatus for expanding and filling plastic parisons to form plastic containers with a liquid medium, with at least one transforming station which has a hollow mould, inside which the plastic parisons can be expanded into plastic containers and can be simultaneously filled by application of a liquid medium, wherein the transforming station is arranged on a carrier and wherein the transforming station has a filling device which feeds the liquid medium to the plastic parisons under pressure, wherein the transforming station has a pressure chamber to which a gas can be applied, wherein for filling of the plastic parisons the filling device can be introduced into the pressure chamber and after the filling can be removed at least partially, and wherein a closing unit can be introduced into the pressure chamber, in order to close the expanded und filled plastic containers.

19 Claims, 3 Drawing Sheets

(51) Int. Cl.
*B65B 3/02* (2006.01)
*B65B 3/04* (2006.01)
*B67C 3/22* (2006.01)
*B67C 7/00* (2006.01)
*B29C 49/12* (2006.01)
*B29L 31/00* (2006.01)

(52) U.S. Cl.
CPC ............ *B29C 49/4273* (2013.01); *B65B 3/04* (2013.01); *B67C 3/22* (2013.01); *B67C 7/00* (2013.01); *B29L 2031/7158* (2013.01); *B67C 2003/227* (2013.01)

(58) Field of Classification Search
USPC .... 53/453, 559, 561, 88, 109, 167, 489, 490
See application file for complete search history.

(56) References Cited

U.S. PATENT DOCUMENTS

| | | | | |
|---|---|---|---|---|
| 4,128,383 A * | 12/1978 | Bond | ............... | B29C 49/58 425/529 |
| 5,864,600 A * | 1/1999 | Gray | ............... | G01F 23/2885 378/57 |
| 6,925,780 B1 | 8/2005 | Anderson | ............... | 53/426 |
| 6,948,924 B2 * | 9/2005 | Tsau | ............... | B29C 49/4823 249/102 |
| 8,192,656 B2 * | 6/2012 | Adriansens | ............ | B29C 49/58 264/40.5 |
| 8,828,308 B2 * | 9/2014 | Maki | ............... | B29C 49/0073 264/532 |
| 9,114,560 B2 * | 8/2015 | Baron | ............... | B29C 49/58 |
| 9,987,789 B2 * | 6/2018 | Kumar | ............... | B29C 49/12 |
| 10,046,505 B2 * | 8/2018 | Kumar | ............... | B29C 49/16 |
| 10,654,212 B2 * | 5/2020 | Okuyama | ............... | B29C 49/06 |
| 2011/0016829 A1 * | 1/2011 | Drenguis | ............... | B65B 55/08 53/426 |
| 2014/0305081 A1 * | 10/2014 | Chauvin | ............... | B29C 49/10 53/453 |
| 2015/0284115 A1 | 10/2015 | Voth et al. | ............... | B65B 3/022 |
| 2016/0144550 A1 * | 5/2016 | Kumar | ............... | B29C 49/58 264/524 |
| 2017/0217076 A1 | 8/2017 | Shiokawa et al. | ...... | B29C 49/06 |
| 2017/0312979 A1 * | 11/2017 | Andrieux | ............... | B29C 49/12 |
| 2019/0240891 A1 * | 8/2019 | Ishii | ............... | B29C 49/4273 |
| 2019/0358885 A1 | 11/2019 | Linke et al. | ............ | B29C 49/06 |

FOREIGN PATENT DOCUMENTS

| | | | | |
|---|---|---|---|---|
| WO | WO 2013020884 | 2/2013 | ............ | B65B 3/02 |
| WO | WO 2017078773 | 11/2017 | ............ | B29C 49/46 |
| WO | WO 2018185277 | 11/2018 | ............ | B29C 49/46 |

OTHER PUBLICATIONS

European Search Report (w/machine translation) issued in application No. 1920375.6, dated Mar. 12, 2020 (19 Pgs).

* cited by examiner

MOULD FILLING WITH SUBSEQUENT CLOSING UNDER INTERNAL PRESSURE

BACKGROUND OF THE INVENTION

The present invention relates to an apparatus and a method for transforming plastic parisons into plastic containers. Such methods have been known for a long time from the prior art. In conventional methods, heated plastic parisons are first of all expanded to form plastic containers, which takes place for example in blow moulding machines. These containers thus expanded are then filled with a filling material, such as for instance a beverage.

More recently, apparatus and methods have become known in which plastic parisons are filled directly with the filling material to be introduced and in this case are also expanded. In order to shape a container from a parison with the aid of a liquid medium, the parisons heated by means of an oven are transferred to a transforming station. After the container has been shaped inside the transforming station and has been simultaneously filled with the liquid medium, the finished but still unclosed container is removed from the transforming station and is passed on by means of a container transport.

While the containers are being expanded and simultaneously filled, they are under a high pressure. For this purpose it is known that the pressure by which the liquid filling material is introduced into the plastic parison to be expanded is generated by means of a pressure generating device or a pressure application device, such as for instance a pump or also a piston. After the expansion and filling of the containers, the containers are relaxed according to the prior art to ambient pressure and are transported further.

This is particularly disadvantageous in the case of carbonised filling material, because in this case over-foaming can occur. Even in the case of so-called hot-fill processes, in which a heated filling material is introduced into the containers, the current state of the art is negative. If the containers which have been relaxed to ambient pressure are closed, while the filling material is still heated a negative pressure is produced during the cooling process of the filling material. As a result there is a danger of deformation of the plastic containers. This deformation is currently counteracted by specific design features of the bottles, but this in turn leads to a lack of design freedom. In the context of this invention, even in the case of still filling material the mechanical resilience of the plastic containers, in particular the topload resilience, should be increased.

Therefore the object of the present invention is to provide an apparatus and a method in order to overcome the current disadvantages of the prior art.

SUMMARY OF THE INVENTION

An apparatus according to the invention for expanding and filling plastic parisons to form plastic containers by means of a liquid medium has at least one transforming station which in turn has a hollow mould, inside which the plastic parisons can be expanded into plastic containers and can be simultaneously filled by application of a liquid medium. In this case the transforming station is arranged on a preferably movable support. Moreover, the transforming station has a filling device which delivers the liquid medium under pressure to the plastic parisons.

Moreover, according to the invention the transforming station has a pressure chamber to which a gas can be applied, wherein for filling of the plastic parisons the filling device can be introduced into the pressure chamber and after the filling can be withdrawn at least partially, and wherein a closing unit can be introduced into the pressure chamber, in order to close the expanded und filled plastic containers.

Within the context of the present application, the transforming station is understood to mean the entire device which in particular also comprises a pressure generating device and at least one filling device. The filling device is understood to be the component of the apparatus which introduces the liquid into the respective container.

A closing unit is understood to be the component which delivers a container closure to the respective container and attaches the container closure to the container.

The plastic containers can be in particular liquid containers, in particular beverage containers, such as for example bottles. The plastic containers preferably have a main body and an (open) mouthpiece. The mouthpiece can preferably be closed by a container closure. The container closure can be selected according to conventional configurations. Push-on closures or screw closures may be considered for example. The container closure can have a safety ring, in particular in the form of a perforated plastic ring, which upon first opening of the container closure is torn off or torn apart on the perforation.

The hallow mould in which the plastic parisons are shaped has a negative of the container to be produced. In this case during expansion the plastic parisons are preferably expanded against the inner wall of this hollow mould. Therefore in order to be able to produce different containers, the hollow mould is designed to be replaceable. The hollow mould preferably consists of two side parts. These are preferably arranged pivotably relative to one another, so that a plastic parison can be easily accommodated or a plastic container can be easily removed. Moreover, the hollow mould advantageously has a base part. The hollow mould is preferably arranged on a mould support shell. Preferably, this mould support shell is in turn arranged on a mould support. The hollow mould is advantageously designed so that it can be temperature-controlled. Temperature control can take place either on the hollow mould itself, via the mould support shell or via the mould base.

The pressure chamber is preferably arranged above the hollow mould in the transforming station. In the present invention terms such as "top" and "bottom" should be understood as an indication of direction with respect to the plastic parisons or plastic containers. In the case of a plastic parison or plastic container the region of the mouthpiece is designated as the "top". These indications of direction do not have to be identical to the indications of direction in the earth's gravitational field. However, the indications of direction preferably correspond substantially to the indications of direction in the earth's gravitational field. In this case "substantially" should be understood to mean that deviations of a few degrees are also covered.

In an advantageous embodiment the main body of the plastic parison or the plastic container is located in the hollow mould, whilst the mouthpiece is outside the hollow mould. The mouthpiece is preferably located inside the pressure chamber.

The filling device can be configured in the form of an elongated nozzle, by which the liquid medium is delivered to the plastic parison for expanding and filling.

In an advantageous embodiment the filling device can be applied to a mouthpiece of the plastic parison so as to form a seal. For this purpose the filling device can preferably have a sealing device. This sealing means can form a seal for example with a carrying ring of the plastic container or with an outer or inner wall of the mouthpiece.

Particularly preferably the filling device supplies the volumetric flow and the pressure in order to shape the container. In this case the filling device can in particular supply a pressure of more than 10 bars, particularly preferably more than 15 bars. In this case both the mouthpiece and also at least partially the filling device are advantageously located within the pressure chamber. In this case the pressure is preferably generated by means of a pressure generating device. The pressure generating device for the filling device is preferably arranged outside the pressure chamber.

Moreover, the apparatus preferably has a reservoir for the filling material.

In a particularly advantageous embodiment a pressure can be applied to the pressure chamber simultaneously with the expanding and filling operation. In the pressure chamber the pressure is preferably generated by means of a delivery of a pressurised gas. This may be for example $CO_2$, $N_2$ or ambient air. However, another gas is also possible.

The closing unit is preferably movable in a straight line onto the plastic container. In particular an accommodated container closure is preferably also movable in a straight line onto the plastic container. Particularly preferably the container closure is held by the closing unit in such a way that it is advanced directly onto the mouthpiece of the plastic container in the event of movement of the closing unit in a straight line. The linear movement of the closing unit can take place in particular by a cam, a servomotor or with the aid of a spring preload. The direction of this linear movement of the closing unit towards the mouth of the plastic container is designated as the feed direction of the closing unit.

In a preferred embodiment the feed direction of the closing unit is not parallel to a longitudinal axis of the plastic containers. Thus the longitudinal axis of the plastic containers and the feed direction of the closing unit advantageously enclose an angle which is different from 0°. In this case, however, this is advantageously an angle which is at most 90°. The longitudinal axis of the plastic containers and the feed direction of the closing unit enclose an angle which is below 80", more preferably below 70° and particularly preferably below 65°. The angle is preferably greater than 10°, more preferably greater than 15° and particularly preferably greater than 20°.

The filling device is preferably arranged in the longitudinal axis with respect to the plastic parison or the plastic container.

Moreover, the apparatus preferably has a stretching rod. This stretching rod is advantageously suitable and intended to pre-stretch the plastic parison in the axial direction. Preferably, therefore, the stretching rod is arranged in the longitudinal axis with respect to the plastic parison. The stretching rod is advantageously integrated into the filling device. In particular the stretching rod can run inside the filing device. However, it is also possible that the stretching rod itself is constructed as a filling device.

In an alternative preferred embodiment the filling device is introduced into the pressure chamber obliquely with respect to a longitudinal axis of the plastic parisons. Thus the longitudinal axis of the plastic parisons or plastic containers and the filling device advantageously enclose an angle which is different from 0°. In this case the angle is preferably selected so that an optimum of the flow resistance of the liquid medium and the forces on seals or guides is produced. In this case, however, this is an angle which is less than 90°. The longitudinal axis of the plastic parisons or plastic containers and the filling device enclose an angle which is below 80°, more preferably below 70° and particularly preferably below 65°. The angle is preferably greater than 10°, more preferably greater than 15° and particularly preferably greater than 20°.

Because the filling device is obliquely with respect to the longitudinal axis of the plastic parisons, it is possible only with difficulty to integrate a stretching rod as in the prior art.

According to the prior art both the filling device and also the stretching rod are arranged parallel to the longitudinal axis of the plastic parisons. In this case the stretching rod according to the prior art is usually selectively constructed as a filling device or the stretching rod extends within the filling device.

In a preferred embodiment the plastic parison is mechanically stretched with a stretching device. Advantageously a stretching device is provided in the longitudinal direction of the plastic parison, and pre-stretches the plastic parison before the expansion operation with the liquid medium begins.

For better guiding of the plastic parison for example a counter-stretch rod can be provided. In this case a rod is raised from the base cup to the outer face of the plastic parison. The tip of the plastic parison is advantageously located between a stretching rod and a counter-stretch rod. As a result it is advantageously possible to prevent the injection point from shifting.

In a variant of an embodiment without a stretching rod it is advantageously possible to apply an impulse to the plastic parison. This impulse is preferably strong enough to stretch the plastic parison longitudinally. In this embodiment the tip is advantageously stabilised by a counter-stretch rod, without a stretching rod counteracting it from the other side.

It is also possible to influence the material distribution in another way from below in the hollow mould. Thus for example it is conceivable that in the hollow mould a negative pressure is applied which assists the expansion of the plastic parison.

In a further preferred embodiment the closing unit is arranged in an axis with a longitudinal axis of the plastic parison or the plastic container. Thus the filling device preferably encloses with the closing unit a angle which is different from 0°. The closing unit is advantageously arranged on the side of the pressure chamber which lies opposite the side which accommodates the mouthpiece of the plastic parison or of the plastic container. The closing unit and the mouthpiece are preferably spaced apart spatially from one another to a maximum extent inside the pressure chamber.

The closing unit advantageously has a holding device which can accommodate and hold a container closure. This holding device is preferably arranged on the closing unit in such a way that the holding device and an optionally accommodated container closure protrude into the pressure chamber.

Moreover, the closing unit facilitates a rotary movement of the container closure. Particularly preferably the closing unit is suitable and intended to attach a container closure to the mouthpiece of a plastic container. In particular it is suitable and intended to screw a container closure to the mouthpiece of a plastic container.

In a likewise preferred embodiment the stretching rod and/or the filling device enable a rotary movement of the container closure. It is also conceivable that a separate rotary device is arranged in the pressure chamber. Advantageously the container closure which is advanced by the closing unit towards the plastic container can be screwed on the mouthpiece of the plastic container by the stretching rod and/or the filling device and/or a separate rotary device.

In a likewise preferred embodiment, for example for snap-on closures, the container closure can be pressed on the mouthpiece of the plastic container by the stretching rod and/or the filling device.

Moreover, in a preferred embodiment the closing unit can attach a safety ring to the plastic container. This safety ring is advantageously arranged on the container closure. The closing unit can preferably attach and in particular screw a container closure with a safety ring on the mouthpiece of a plastic container. This preferably takes place by a rotary control. In this case the torque is advantageously detected in order to establish when the container is closed.

In a preferred embodiment the closing unit can be moved from a region outside the pressure chamber into a region in the pressure chamber and vice versa. Therefore the wall of the pressure chamber advantageously has an opening through which the closing unit can be introduced. The opening in the wall is preferably closed by the closing unit. The opening in the wall is preferably also closed by the closing unit if the closing unit is moved to the maximum extent into the pressure chamber.

Therefore the closing unit is advantageously sealed towards the wall of the pressure chamber. Lip seals for example may be considered for this sealing. It is also possible that the closing unit moves onto a flange and forms a seal there. The linear movement is advantageously carried out and sealed off in a longitudinal guide of the closing unit. This has the advantage that the seal does not have to be threaded in every linear movement of the closing unit. Thus less wear occurs.

In a further preferred embodiment the closing unit can be withdrawn completely from the pressure chamber. Advantageously the closing unit, when it is completely withdrawn from the pressure chamber, can receive a container closure outside the pressure chamber. The reception of the container closure is preferably independent of a state of occupation of the transforming station. The reception of a container closure by the closing unit is preferably possible during the transfer of a plastic parison to the transforming station. The closure can preferably be introduced at ambient pressure into the pressure chamber, before the pressure is raised. However, it would also be conceivable for the reception of the container closure to take place during the expansion and filling operation.

The possibility of complete withdrawal of the closing unit can also be used advantageously for pressure relief of the transforming station.

Moreover, in a preferred embodiment the apparatus has a feeding device which feeds container closures to the closing element. This feeding device is advantageously arranged completely outside the pressure chamber and the hollow mould. The container closures can preferably be removed from this feeding device by the closing unit if the closing unit is withdrawn completely from the pressure chamber.

The apparatus advantageously has a reservoir for container closures. The feeding device preferably feeds container closures from this reservoir to the closing unit.

In a preferred embodiment the filling device is provided with a drive which is designed so that it can move the filling device. This may for example be an electric motor-powered drive, a magnetic drive element, a pneumatic drive element or a hydraulic drive. A linear movement of the filling device can preferably be generated by this drive. This linear movement advantageously takes place in an axis which is obliquely with respect to the longitudinal direction of the plastic parisons.

In a further preferred embodiment the pressure chamber has a seal which seals the pressure chamber downwards. This sealing may take place for example between the pressure chamber and the hollow mould. However, this sealing can also be provided between the pressure chamber and the plastic parison or the plastic container. Sealing between the pressure chamber and the plastic parison or the plastic container can be configured for example as sealing on the carrying ring or externally on the mouthpiece. However, sealing on a different geometry of the plastic parison or of the plastic container would also be conceivable. However, this sealing would also be possible both between the pressure chamber and the hollow mould and also between the pressure chamber and the plastic parison or the plastic container.

Moreover, in a preferred embodiment a locking of the position of the pressure chamber and/or the filling device can take place. In this case it is advantageous that the contact pressure of the pressure chamber and/or the filling device do not have to be maintained.

In an advantageous embodiment the seal can be configured as an actively switchable seal, A movement of the entire pressure chamber including the filling device would also be conceivable. Moreover, in the case of an active seal the apparatus preferably has a safety device in order to avoid faulty operations.

In an advantageous embodiment the pressure chamber has a pressure regulator in order to set the pressure level in the pressure chamber. The apparatus preferably also has a pressure regulator for regulating the pressure in the filling device.

The apparatus advantageously has a control device for controlling the pressure regulator. The pressure regulator can preferably bring the pressure chamber to a pressure level to be set. The volume of the filling device and/or the closing device can preferably be taken into consideration in the control device. In particular the change in volume of a filling device and/or closing device to be introduced or withdrawn is taken into consideration by the control device.

The apparatus preferably has conduits by means of which gas can be withdrawn from the pressure chamber or led towards it. The apparatus can advantageously also have a tank or annular channel, from which gas can be fed to the pressure chamber by means of the conduits, Recycling of the gas drawn off from the pressure chamber by means of the conduits can advantageously also take place, and in particular this gas can be returned to the tank or annular channel.

In an advantageous embodiment the apparatus has a cleaning lance in order to carry out cleaning in the UP process, that is to say cleaning without disassembly of the apparatus. In the cleaning process the cleaning lance can preferably be arranged at the position of the closing device. Advantageously in particular the filling device can be flushed through. The cleaning lance can preferably also take on the cleaning of the hollow mould as well as the stretching rod. For this cleaning step the filling device is particularly preferably fully retractable.

In a further preferred embodiment a change in volume of the pressure chamber is possible. This is particularly advantageous if various plastic containers are to be produced with different mouthpieces. Due to the change in volume of the pressure chamber it is possible to keep the pressure range as small as possible. In this way the necessary gas consumption can be reduced.

Moreover, a further advantageous embodiment includes at least one inspection device. The inspection device is preferably suitable and intended to check the sealing integrity between the filling device and the plastic parison or plastic container. A further inspection device is advantageously provided, by which the sealing between the container closure and the plastic container can be checked. It is also conceivable that both checks are carried out by the same inspection device.

In a further advantageous embodiment the apparatus has a plurality of transforming stations. The apparatus preferably has a carrier on which the transforming stations are arranged. This is preferably a movable carrier. In particular in this case this may be a rotatable carrier and in particular a carrier which is rotatable about a predetermined axis of rotation, wherein the transforming stations are preferably arranged on the outer periphery thereof. However, it would also be conceivable that the transforming stations are transported at east partially along a rectilinear transport path. Thus the transforming stations can be arranged for instance on a circulating chain. It would also be conceivable that the transforming stations are transported in a straight line or that the containers are introduced into stationary transforming stations or are transported to them.

In a further advantageous embodiment with a plurality of transforming stations the apparatus preferably has a common reservoir for the filling material. The filling material is preferably fed to the individual transforming stations by means of a distributor.

Moreover, in a preferred embodiment the apparatus has at least one heating element. The temperature of the liquid medium can be regulated advantageously by at least one heating element. Particularly preferably, each transforming station has its own heating element in order to be able to regulate the temperature of the liquid medium for each plastic container separately.

Furthermore, the present invention relates to a method for expanding and filling plastic parisons to form plastic containers by means of a liquid medium, wherein the plastic parisons are expanded to the plastic containers and simultaneously filled inside a hollow mould of a transforming station by application of a liquid medium, wherein a filling device of the transforming station fills the plastic parisons under pressure with the liquid medium, and wherein a closure device closes the expanded and filled plastic containers.

According to the invention the plastic containers are closed while they are still located in the transforming station and by means of a pressure chamber are under a pressure which lies above the ambient pressure.

In this case the described apparatus is in particular configured and provided in order to carry out this method, i.e. all the features set out for the described apparatus are likewise disclosed for the method described here, and vice versa.

Advantageously the plastic parisons are expanded and filled under high pressure. In this so-called moulding phase a liquid medium is fed by means of the filling device to the plastic parisons. The pressure in the filling device is preferably more than 10 bar and particularly preferably more than 15 bar. The moulding phase is preferably followed by a so-called holding phase in which furthermore the expanded and filled plastic containers are under high pressure. The pressure exerted at the end of the moulding phase is preferably maintained in the holding phase.

The pressure is advantageously maintained until the plastic containers are cooled to such an extent that there is no longer any fear of an unwanted deformation. Particularly preferably the pressure is maintained until the temperature of the plastic containers has dropped below the glass transition temperature. The glass transition temperature of PET is approximately 75-80° C.

After the end of the holding phase, in the pressure relief phase the pressure in the pressure chamber—and thus also the pressure applied to the plastic containers—is preferably reduced. In this case the pressure can be reduced either in stages or directly. Preferably, however, the pressure is not reduced completely to the ambient pressure. Particularly preferably, a residual pressure which is above the ambient pressure remains in the holding chamber. After the expansion and filling, the plastic containers are advantageously not completely relieved of pressure, but until closing a pressure which lies above the ambient pressure is maintained.

In an advantageous method at the beginning of the moulding phase a filling device is introduced into the pressure chamber and pressed onto the mouthpiece of the plastic parison in a sealing manner. After the moulding phase the filling device is advantageously lifted off from the mouthpiece of the plastic prison. At this time a pressure is preferably applied to the pressure chamber. The filling device is advantageously moved at least partially out of the pressure chamber. The closing unit preferably moves subsequently or simultaneously with a container closure onto the mouthpiece of the plastic container.

In an advantageous method the closing unit itself attaches the container closure to the mouthpiece of the plastic container, wherein it can screw the container closure in particular onto the mouthpiece.

In a preferred method the container closure is also put on with the aid of the stretching rod and/or the filling device. Thus the stretching rod and/or the filling device advantageously takes on at least one working step during closing of the plastic container.

The stretching rod and/or the filling device can advantageously press a snap-on closure onto the mouth region of the plastic container. In the case of a screw closure the stretching rod and/or the filling device can advantageously produce small rotations. However, it is also conceivable that a separate rotating device is integrated into the pressure chamber and screws the container closure on.

In an advantageous method the container closure is introduced into the pressure chamber at ambient pressure. Advantageously, only then the pressure in the pressure chamber is raised.

In a preferred method the pressure is set in the pressure chamber before the filling device is moved away from the mouthpiece of the plastic container. Advantageously the pressure is regulated thereafter. In this case, on the one hand, the volume of the filling device while it is moved out of the pressure chamber and, on the other hand, the volume of the closing unit while it is moved into the pressure chamber are preferably taken into consideration. Because of this introduction or removal of the filling device or the closing unit it may be necessary to feed or draw off the pressurised gas.

In the case of carbonised filling material the pressure during closing is preferably above the saturation pressure of the filling material. In the pressure relief phase the pressure preferably does not drop below the saturation pressure, that is to say that advantageously the pressure is not built up again during the closing operation, but a residual pressure from the moulding phase is maintained, in this way overfoaming of the filling material can be avoided particularly easily. Thus advantageously process time can also be saved.

Advantageously, however, in the case of non-carbonised filling material a pressure above the ambient pressure is also maintained. In the hot-fill process this results in a positive pressure which also still acts inside the plastic containers in the recooling process. In this way deformations of the bottle are counteracted. Because fewer deformations occur, for example, the wall thickness of the plastic containers may be reduced, which leads to savings of material and weight advantages. Also in the cold-till process, closing under internal pressure is advantageous, Here too, the stability of the plastic containers is increased by the slight positive pressure.

As an additional advantage of this method it has been shown that closing while still in the transforming station is also advantageous because spillage of the filling material during further transport of the containers can be prevented.

Moreover, in an advantageous method the filling level of the filling material inside the plastic container can be set. For this purpose two different procedures are possible.

On the one hand the filling level can be set in that during the pressure relief phase meanwhile a pressure can be set in the pressure chamber which corresponds to the ambient pressure or is below it. In this method step filling material from the plastic container can then be extracted again. The extracted product can preferably be reused. The extracted product is advantageously pumped back into a reservoir. This method can also be advantageous in order for example to briefly separate the sealing connection of the filling device and/or in order to supply closures. However, this method is preferably applied only in the case of non-carbonised filling material. In the case of carbonised filling material in this method there is a danger of over-foaming, since in the meantime the advantages of positive pressure (in particular above the saturation pressure) have been disregarded.

In the event of an alternative setting of the filling level, a gas which is under positive pressure is led into the plastic container. In this way filling material is pressed out of the plastic container. This pressed-out filling material is led by means of conduits for example in the direction of the tank. In this way the filling level in the plastic container can be set by means of the quantity of gas introduced. This setting of the filling level is suitable in particular in the case of carbonised filling material. 002 may be considered as the gas.

In an advantageous method the plastic parisons can be flushed before the expansion and filling. In this case in particular flushing with $N_2$ or $CO_2$ is advantageous, in this way the oxygen in the plastic parisons can be reduced.

Cleaning of the apparatus parts in situ can also take place advantageously in the context of a CIP process. In this case the filling device is preferably flushed through and removed from the pressure chamber. After the filling device has been removed, a cleaning lance can advantageously take over the cleaning of the hollow mould.

In an advantageous method the pressing force of the filling device against the plastic parison and/or the pressure of an active seal can be regulated in a closed-loop control. For this purpose at least one inspection device advantageously checks the sealing integrity of the filling device relative to the plastic parison and/or the sealing integrity of the sealing of the container closure towards the plastic container. In accordance with this inspection, parameters such as the pressing force or the pressure of the active seal can be adjusted.

In an alternative method pressure relief to ambient pressure could also take place. In this case pressure relief takes place in stages in this way over-foaming of carbonised filling material can also be avoided.

Therefore the applicant reserves the right also to claim protection for a method for expanding and filling plastic parisons to form plastic containers by means of a liquid medium, wherein the plastic parisons are expanded to the plastic containers and simultaneously filled inside a hollow mould of a transforming station by application of a liquid medium, wherein a filling device of the transforming station fills the plastic parisons under pressure with the liquid medium, and wherein a closure device closes the expanded and filled plastic containers, wherein according to the invention in a first step the plastic containers are expanded and filled under pressure, in a second step this pressure is maintained, in a third step the pressure is reduced in stages, and in a fourth step the plastic containers are closed in the transforming station. In this embodiment the pressure can be relieved to ambient pressure.

BRIEF DESCRIPTION OF THE DRAWINGS

Further advantages and embodiments are apparent from the appended drawings.

In the drawings.

DETAILED DESCRIPTION OF THE INVENTION

Figure 1:
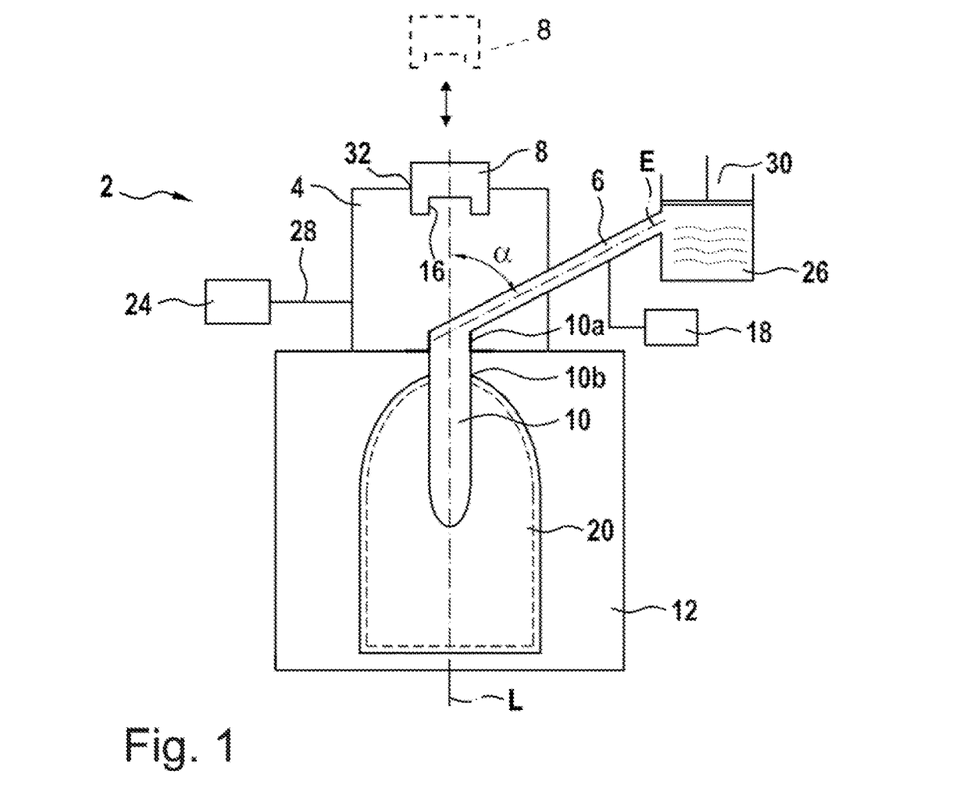
FIG. 1 shows a schematic representation of the transforming station according to the invention.

FIG. 1 shows a schematic representation of a transforming station according to the invention. It shows the hollow mould 12, in which a plastic parison 10 can be expanded into a plastic container 20 (represented by a broken line). This hollow mould 10 comprises the complete main body of the plastic parison or plastic container. The mouthpiece 10a of the plastic parison or plastic container projects out of this hollow mould. The pressure chamber 4 is located above the hollow mould 12. This comprises the mouthpiece 10a of the plastic parison or plastic container.

The filling device 6 is fitted onto the mouthpiece 10a. The filling device is obliquely with respect to the longitudinal axis L of the plastic parison or plastic container. The longitudinal axis of the plastic parison or plastic container and the longitudinal axis of the filling device E lie at an angle α relative to one another.

Liquid medium from a reservoir 26 is delivered to the plastic parison by means of the filling device 6. The liquid medium is delivered by means of pressure. The pressure is generated by means of a pressure generating device 30. The filling device can be moved by means of a drive 18, in particular at least partially withdrawn from the pressure chamber 4 or introduced into it. The introduction or withdrawal movement preferably takes place in a straight line, and thus also during the movement the longitudinal axis of the plastic parison or plastic container and the longitudinal axis of the filling device E lie at an angle α relative to one another. The drive 18 may for example be an electric motor.

A gas can be delivered to the pressure chamber 4 or drawn off from the pressure chamber by means of conduits 28. The delivery or discharge of the gas is undertaken by the pressure regulator 24.

There is a closer receiving opening 32 on the upper side of the pressure chamber 4. A closing unit 8 can be introduced into this opening. When the dosing unit 8 is introduced, the closer receiving opening 32 is completely closed. The closing unit 8 can hold a container closure 16 by means of a holding device. As shown in phantom in FIG. 1, the closing unit 8 may be withdrawn completely from the pressure chamber 4.

Figure 2:
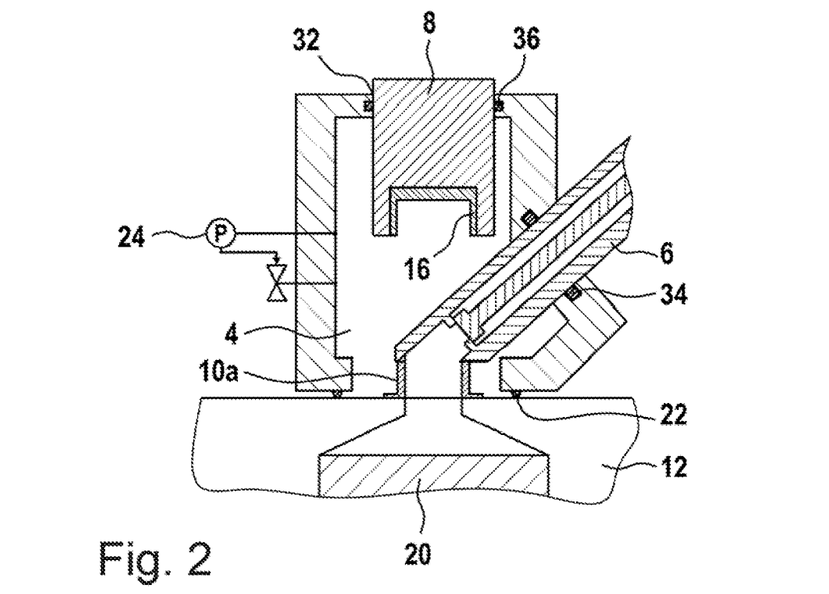
FIG. 2 shows an enlarged schematic representation of the transforming station according to the invention.

FIG. 2 shows an enlarged detail of the transforming station according to the invention, in particular the pressure chamber 4. In particular it again shows the hollow mould 12, the filling device 6, which is pressed onto the mouthpiece 10a, and the closing unit 8. It can be seen that the pressure chamber 4 is sealed downwards towards the hollow mould 12 by seals 22, towards the filling device with seals 34 and towards the closing unit with seals 36.

Figure 3:
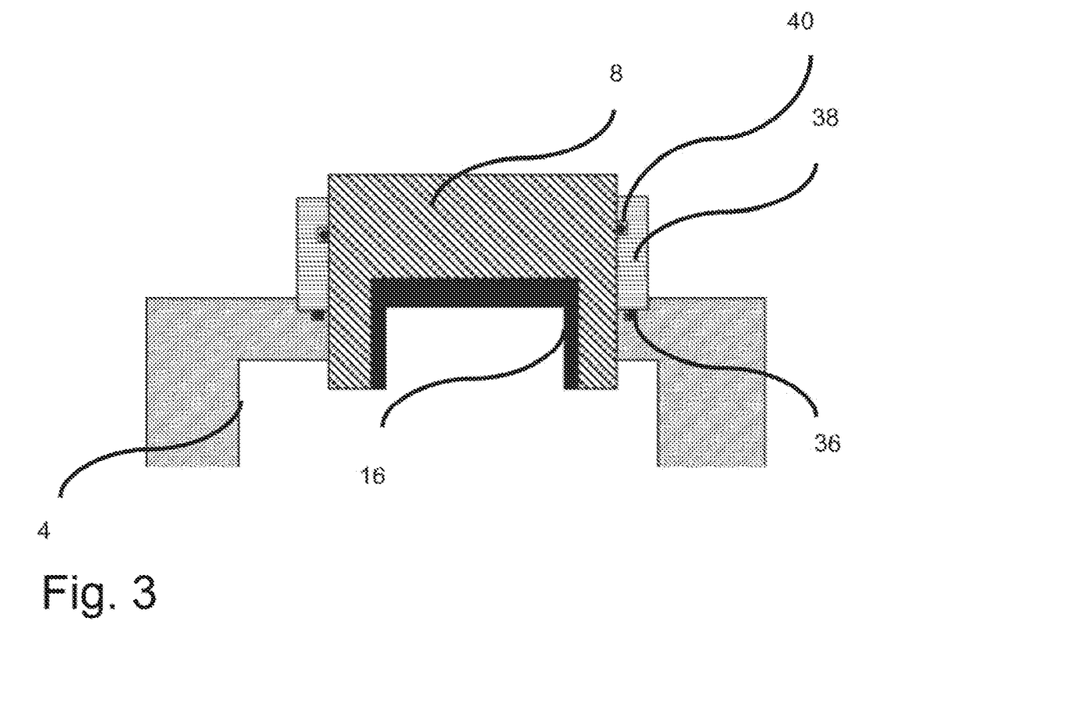
FIG. 3 shows a possible configuration of the seals of the closing unit.

FIG. 3 shows a possible configuration of the closing unit 8. Here too the seals 36 can be seen. Additionally it can be seen that the closing unit 8 can be moved by means of a longitudinal guide 38 into the pressure chamber 4 or discharged therefrom. Also with regard to the longitudinal guide 38 there must be a seal 40.

Figure 4:
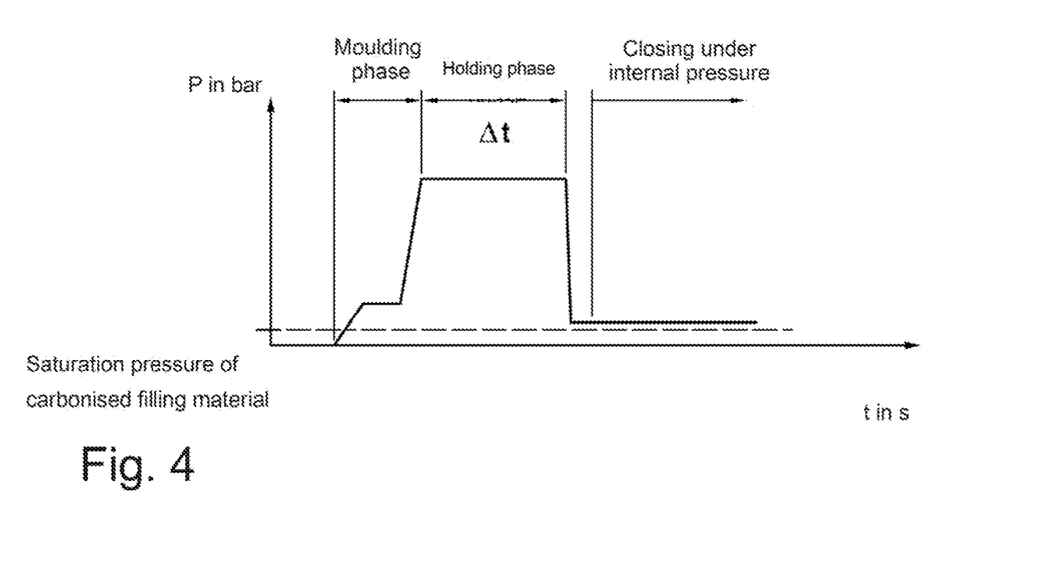
FIG. 4 shows a diagram with preferred pressure profile.

In a t-p diagram FIG. 4 shows the pressure profile in the course of the method according to the invention. At the beginning of the moulding phase the pressure is increased. The pressure can be increased in stages. Then follows a holding phase, in which the pressure is kept constant over a certain time Δt. Then comes a pressure relief phase, in which the pressure drops—abruptly in FIG. 4. In this case, however, the pressure does not drop back to the starting level, the ambient pressure. Instead of this a certain internal pressure persists. In this case this internal pressure lies in particular above a saturation pressure of the carbonised filling material (shown by a broken line).

Figure 5:
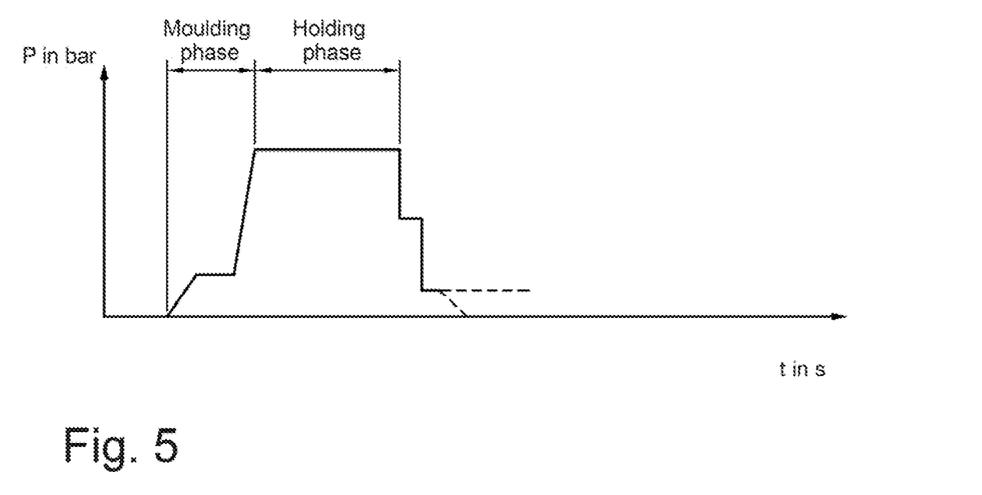
FIG. 5 shows a diagram in the event of a pressure reduction in stages.
Figure 6:
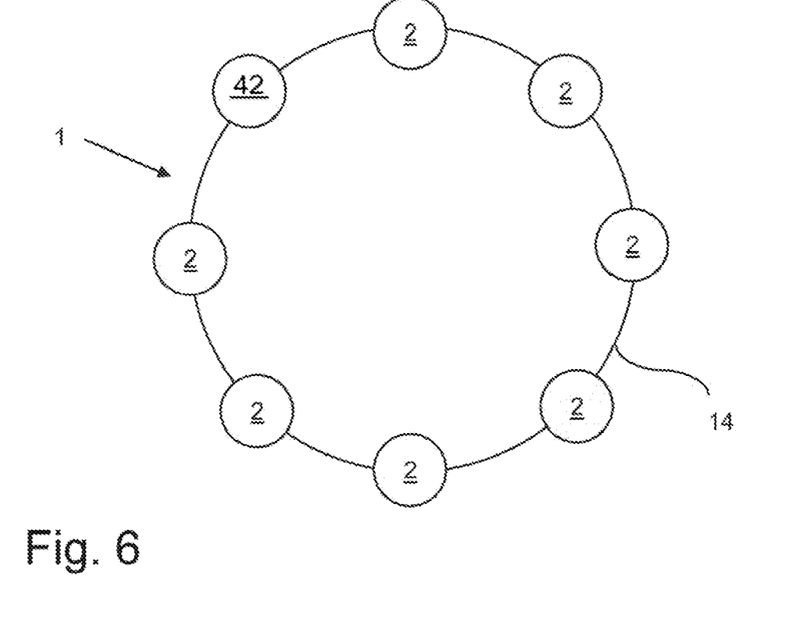
FIG. 6 shows a schematic representation of an apparatus according to the invention.

FIG. 5 shows that after the holding phase the pressure can also decay in stages. In this case the pressure can recede preferably likewise only up to a certain internal pressure above the saturation pressure. However, it would also be conceivable (shown by a broken line) that after decaying in stages the pressure recedes to ambient pressure, FIG. 6 shows an apparatus according to the invention with several transforming stations. In this case the transforming stations are arranged on a movable carrier. FIG. 6 shows as an example an apparatus of the rotary machine type, in which the transforming stations are arranged on a rotatable carrier. The apparatus also may include at least one inspection device 42 which is configured to check the sealing integrity between the filling device and the plastic narison or plastic container. However, it is likewise conceivable that the transforming stations are mounted on a linear carrier.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 apparatus
2 transforming station
4 pressure chamber
6 filling device
8 closing unit
10 plastic parison
10a mouthpiece of the plastic parison/plastic container
10b main body of the plastic parison/plastic container
12 hollow mould
14 carrier
16 container closure
18 drive
20 plastic container
22 seal
24 pressure regulator
26 reservoir for liquid medium
28 conduits
30 compressed air generating device
32 closer receiving opening
34 seals for filling device
36 seas for closing unit
38 longitudinal guide
40 seals for longitudinal guide
42 inspection device
L longitudinal axis of a plastic parison/plastic container
E longitudinal axis of the filling device
α angle between the longitudinal axis of the plastic parison or plastic container and the on axis of the filling device E

The invention claimed is:

1. An apparatus for expanding and filling plastic parisons to form plastic containers with a beverage, with at least one transforming station which has a hollow mould, inside which the plastic parisons are expanded into plastic containers and simultaneously filled by application of the beverage through a mouthpiece of the plastic parison, wherein the transforming station is arranged on a carrier and wherein the transforming station has a filling device configured to feed the beverage to the plastic parisons under pressure, wherein the transforming station has a pressure chamber to which a gas is applied, wherein for filling of the plastic parisons the filling device is introduced into the pressure chamber and after the filling is removed at least partially, and wherein a closing unit is introduced into the pressure chamber, in order to close the expanded and filled plastic containers, wherein the plastic containers are beverage containers and wherein a main body of the plastic parison or the plastic container is located in the hollow mould and the mouthpiece is located inside the pressure chamber, and a container closure is introduced at ambient pressure into the pressure chamber, before the pressure is raised, and wherein the closing unit is configured to be withdrawn completely from the pressure chamber, and the closing unit, when completely withdrawn from the pressure chamber, is configured to receive a container closure outside the pressure chamber.

2. The apparatus according to claim 1, wherein the filling device is configured to be applied to a mouthpiece of the plastic parison in a sealing manner.

3. The apparatus according to claim 2, wherein the filling device is configured to be introduced obliquely with respect to a longitudinal axis of the plastic parisons into the pressure chamber.

4. The apparatus according to claim 2, wherein the filling device is configured to be introduced obliquely with respect to a longitudinal axis of the plastic parisons into the pressure chamber at an angle between 20° and 65°.

5. The apparatus according to claim 1, wherein the filling device is configured to be introduced obliquely with respect to a longitudinal axis of the plastic parisons into the pressure chamber.

6. The apparatus according to claim 1, wherein the closing unit is arranged in an axis with a longitudinal axis of the plastic parison or of the plastic container and/or is movable in a straight line on the plastic container, in order to attach a container closure to a mouthpiece of the plastic container.

7. The apparatus according to claim 1, wherein the filling device is provided with a drive which is configured to move the filling device.

8. The apparatus according to claim 1, wherein the pressure chamber has a seal which is configured to seal the pressure chamber relative to the hollow mould and/or the plastic parison or the plastic container.

9. The apparatus according to claim 1, wherein the pressure chamber has a pressure regulator configured to set the pressure level in the pressure chamber.

10. The apparatus according to claim 1, wherein the filling device is configured to be introduced obliquely with respect to a longitudinal axis of the plastic parisons into the pressure chamber at an angle between 20° and 65°.

11. The apparatus according to claim 1, wherein the hollow mould is temperature-controlled.

12. The apparatus according to claim 1, wherein a volume of the pressure chamber is changeable.

13. The apparatus according to claim 1, wherein the apparatus has at least one inspection device which is configured to check the sealing integrity between the filling device and the plastic parison or plastic container.

14. The apparatus according to claim 1, wherein the apparatus has a plurality of transforming stations, and a common reservoir for the filling material.

15. A method for expanding and filling plastic parisons to form plastic containers with a beverage, wherein inside a hollow mould of a transforming station the plastic parisons are expanded into plastic containers and simultaneously filled by application of the beverage, comprising:
providing an apparatus according to claim 1, wherein the apparatus comprises at least one transforming station which has a hollow mould, inside which the plastic parisons are expanded into plastic containers and simultaneously filled by application of the beverage through a mouthpiece of the plastic parison, wherein the transforming station is arranged on a carrier and wherein the transforming station has a filling device which feeds the beverage to the plastic parisons under pressure, wherein the transforming station has a pressure chamber to which a gas is be applied, wherein for filling of the plastic parisons the filling device is introduced into the pressure chamber and after the filling is removed at least partially, and wherein a closing unit is introduced into the pressure chamber, in order to close the expanded and filled plastic containers, wherein the plastic containers are beverage containers and wherein a main body of the plastic parison or the plastic container is located in the hollow mould and the mouthpiece is located inside the pressure chamber, expanding and filling the plastic parisons under pressure with the beverage while the plastic parisons/containers are located in the transforming station, and closing the expanded and filled plastic containers with the closing device, wherein the plastic containers are closed while they are still located in the transforming station and are under a pressure which is above ambient pressure, and the container closure is introduced into the pressure chamber at ambient pressure and only then the pressure in, the pressure chamber is raised, and wherein the closing unit is configured to be withdrawn completely from the pressure chamber, and the closing unit, when completely withdrawn from the pressure chamber.

16. The method according to claim 15, wherein after the expansion and filling, the plastic containers are not completely relieved of pressure, but until closing a pressure which lies above the ambient pressure is maintained.

17. The method according to claim 16, wherein during the expansion and filling of the plastic parisons a counter-stretch rod is moved from below against a tip of the plastic parisons.

18. The method according to claim 15, wherein during the expansion and filling of the plastic parisons a counter-stretch rod is moved from below against a tip of the plastic parisons.

19. The method according to claim 15, wherein the plastic containers are closed while they are still located in the transforming station and under pressure from a pressure chamber.

* * * * *